Oct. 10, 1939.  K. A. BROWNE ET AL  2,175,825
ENGINE MOUNT
Filed Jan. 8, 1938    4 Sheets-Sheet 1
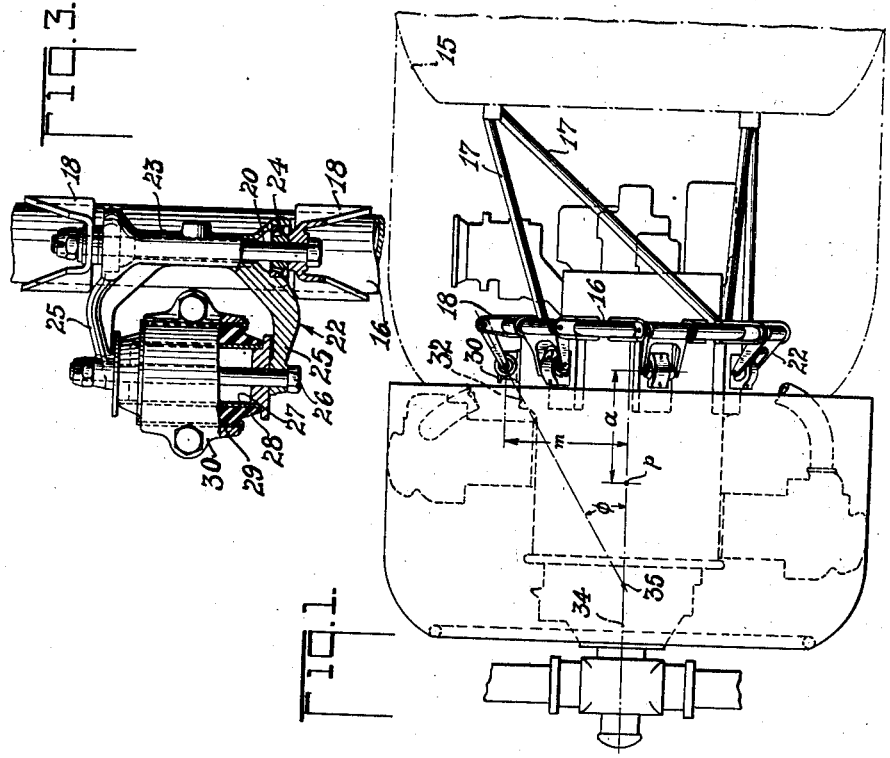
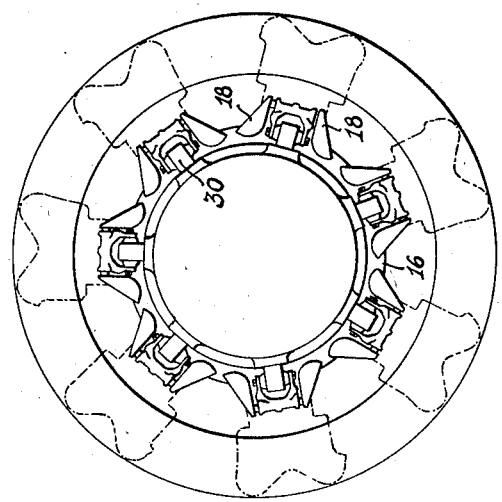
INVENTORS
EDWARD S. TAYLOR
AND
BY KENNETH A. BROWNE
ATTORNEY

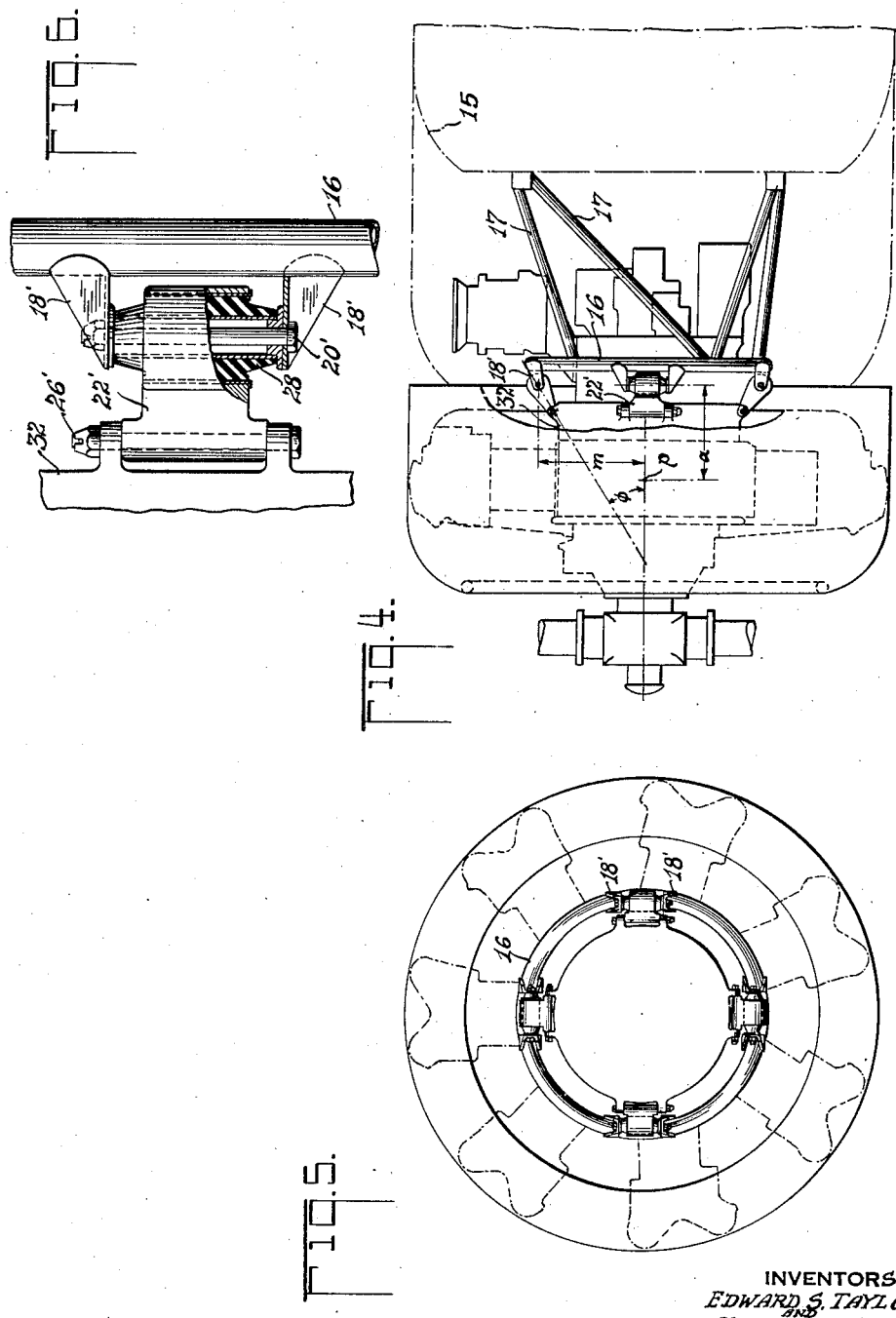

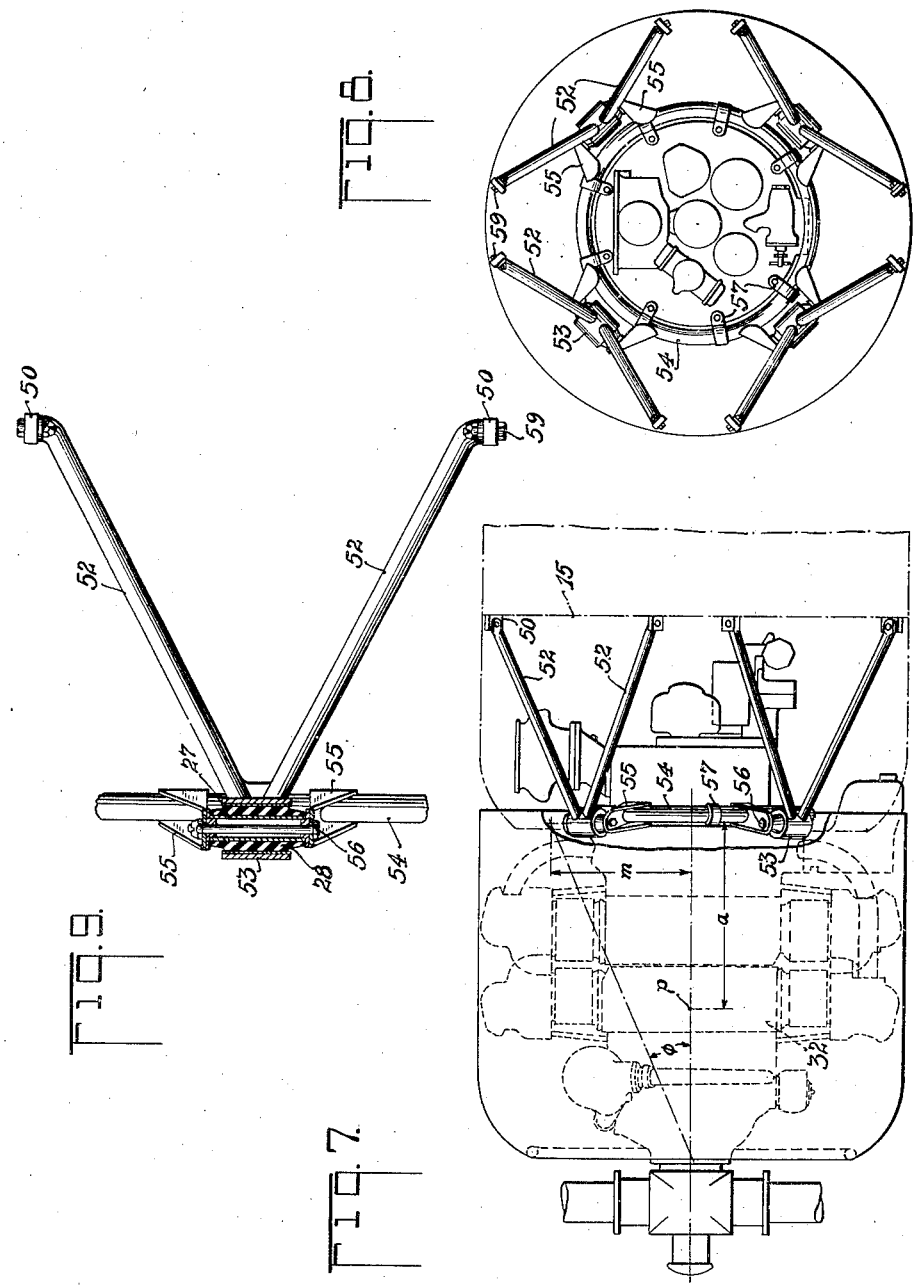

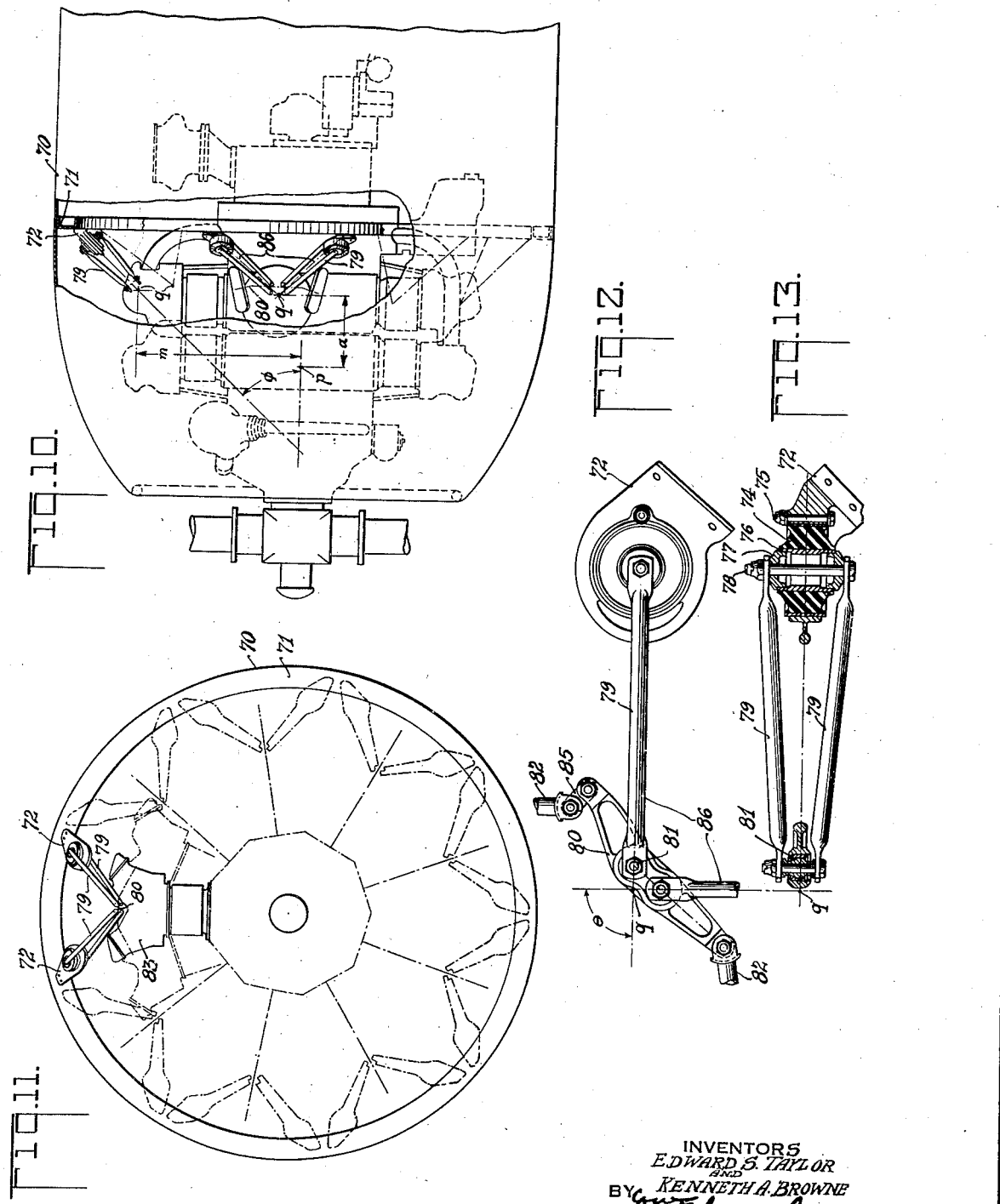

Patented Oct. 10, 1939

2,175,825

UNITED STATES PATENT OFFICE 2,175,825

ENGINE MOUNT

Kenneth A. Browne, Westwood, N. J., and Edward S. Taylor, Cambridge, Mass., assignors, by mesne assignments, to Wright Aeronautical Corporation, Paterson, N. J., a corporation of New York Application January 8, 1938, Serial No. 183,986

23 Claims. (Cl. 248—5)

This invention relates to the mounting of a vibratory mass upon a support in such a manner as to control and to isolate vibration of the mass. The invention comprises, in the main, improvements on the co-pending application of Edward S. Taylor, Serial No. 155,174 filed July 23, 1937, and subscribes to the general teachings of said application. The present invention contemplates specific arrangements for vibration isolating mounts adapted for certain types of vibratory masses in which it is desired to control the stiffness ratios in the several planes of action between the mass and the support in a manner different from that taught in said co-pending application. The invention includes several alternative embodiments any one of which is practical and determinate. One embodiment in particular is so organized as to make the ratio between the spring rates in different planes of action independent of the resilient devices which may be used.

The invention is particularly adapted to the mounting of aircraft engines which are normally mounted from a ring or bulkhead substantially concentric with the power shaft of the engine, the bulkhead being rearwardly disposed with respect to the center of gravity of the power plant. The engine itself, during operation, sets up vibrant couples and forces acting in various directions. A dominant vibratory couple is that due to torsional impulses set up by explosions in the engine cylinders, the frequency of this torsional vibration being, in a nine cylinder engine, 4½ impulses per shaft revolution and, in a 14 cylinder engine 7 impulses per shaft revolution. The conventional engine mount provides means for cushioning these torsional impulses but does not provide for the decoupling of rotational and translational movement in other planes which occur during engine operation. In the conventional installation, where the engine overhangs from its mounting plane, coupling occurs between the rotational and translational movements with the effect that resultant vibrations have a frequency to which the power plant is naturally responsive, within the operating speed range of the engine, whereby resonance occurs between the natural frequency and the exciting forces with consequent amplification and destructive stresses. If the natural frequencies of translation and rotation be decoupled and confined below the minimum frequencies of the power plant in normal operation resonance will not occur and the vibratory stresses in the power plant, airplane, and engine mounting structure are practically eliminated. When this objective is attained, a sense of much smoother power plant operation is experienced by the occupants of the aircraft in addition to the reduced stresses occurring in the structures.

In said Taylor application, Serial No. 155,174 a detailed explanation as to the nature of the vibratory couples and forces was given and a solution was proposed for decoupling the movements to the end that, although the engine mounting connection is actually not coincident or coplanar with the power plant center of gravity, the same effect is obtained as if the power plant were mounted in a plane passing through its center of gravity. The previous application taught the general case of adjusting the stiffness ratios of the resilient mounting means in their several planes of action. The present application teaches means by which certain of these ratios may be adjusted beyond the capabilities of the teaching of the previous application, and likewise teach a mode of mounting in which the stiffness ratios are independent of the characteristics of the resilient medium used by virtue of an improved geometry in the mounting system.

The general formula for evaluating the stiffness relationships between the three principal axes of the resilient mounting means was stated in the previous application and is again indicated below:

$$\frac{a}{m} = \frac{1}{2} \frac{\sin^2 \phi}{\frac{L_2+1}{L_1-L_2} + \sin^2 \phi}$$

wherein $a$ is the distance from the mounting plane to the point of decoupled suspension; $m$ is the effective radius of the mount; $\phi$ is the angle between the engine axis and the axis of maximum stiffness of the engine mounting spring which intersects the engine axis ahead of the point of decoupled suspension of the power plant; $L_1$ is the ratio between the spring rates along that line making the angle $\phi$ with the engine axis and the spring rate along a line tangent to the mounting circle; and $L_2$ is the spring rate along a line normal to that line which makes the angle $\phi$ with the engine axis and to the tangent, and the spring rate along the line tangent to the mounting circle.

In the present case, the ratio $L_2$ is eliminated by making the spring rate forming the numerator of the $L_2$ expression above substantially equal to zero. Accordingly, the essential formula for evaluating the engine mounts of the present case resolves to the following:

$$\frac{a}{m} = \frac{1}{2} \frac{\sin 2\phi}{\frac{1}{L} + \sin^2 \phi}$$

The physical mounting organization appropriate to the teachings of this invention comprises a mounting annulus upon which a number of links, struts or shackles are pivoted. These elements project forwardly and inwardly and are pivoted at their forward ends to the power plant. The elements incorporate resilient devices by virtue of which the power plant may move slightly with respect to the mounting annulus. The angle which the elements make with the engine axis is a determining factor of the design, and the disposition of the resilient devices in the elements is an important consideration which will be more fully explained in the detailed description below.

The objective of the invention is to provide means for controlling the natural frequencies of the various modes of power plant vibration, separately and independently to the end that resonance will be confined to a small range of engine speed well below the minimum cruising speed, and the frequency of no mode will be so low that undue and objectionable power plant excursions will take place resulting from forces applied to the power plant.

Further objects include the provisions of specific structural arrangements which will become apparent in reading the annexed detailed description in connection with the drawings in which:

Fig. 1 is a side elevation of an engine mount according to the invention;

Fig. 2 is a diagrammatic rear elevation of the mount of Fig. 1;

Fig. 3 is an enlarged detailed plan, partly in section, showing the specific shackle type link arrangement according to Fig. 1;

Fig. 4 is a side elevation of an engine mount showing an alternative embodiment of the invention;

Fig. 5 is a rear elevation of the mount of Fig. 4;

Fig. 6 is an enlarged detailed plan, partly in section, showing the specific shackle type link used in conjunction with the mount of Fig. 4;

Fig. 7 is a side elevation of still another alternative mount arrangement utilizing extended links;

Fig. 8 is a rear elevation of the mount of Fig. 7;

Fig. 9 is an enlarged detailed plan, partly in section, showing an extended link utilized in connection with the mount of Fig. 8;

Fig. 10 is a side elevation, partly broken away, showing still another alternative mount arrangement utilizing articulated struts;

Fig. 11 is a diagrammatic front elevation showing the disposition of the struts of the mount of Fig. 10;

Fig. 12 is a fragmentary enlarged plan showing in detail the strut used in connection with the mount of Fig. 10, and Fig. 13 is an enlarged detailed elevation, partly in section, showing the strut arrangement used in connection with Fig. 10.

In the figures, similar numbers indicate parts which are either identical or have a similar function. Referring specifically to Figs. 1, 2 and 3, we show a portion of the fuselage 15 to which a mounting ring 16 is rigidly attached by struts 17, said ring having a plurality of brackets 18 extending outwardly therefrom, the brackets being arranged in pairs as shown in Fig. 2. These brackets provide support for a hinge bolt 20 which lies in the plane of the ring 16 and which is disposed tangentially thereof. Upon the bolt 20 is swingably mounted a shackle link unit 22 comprising a hub 23 journalled, through bearings 24, on the bolt 20, and arms 25 having aligned holes at their ends for the reception of a bolt 26 upon which is mounted a sleeve 27 to which is bonded a rubber bushing 28. An outer sleeve 29 embraces and is bonded to the bushing 28 and is clamped into a bracket 30 rigidly attached to the casing of an engine 32. The several shackle links 22 are similar and the plane of the bolts 26 represents the effective mounting plane which lies a distance $a$ rearward of the point $p$ which is near or at the center of gravity and is the point of decoupled support. The shackle links 22 are so slanted as to make an angle $\phi$ with the engine axis indicated at 34, the intersection of said axis 34 with continuations of the links comprising a point 35 located forwardly with respect to $p$. The distance to the bolts 26 from the engine axis 34 is represented by $m$ and thus the several essential dimensions are identified with respect to the formula presented above. It will be apparent that the stiffness along the shackle link 22 is controlled by the rubber bushing 28 in compression and tension along a diameter thereof. Stiffness on a diameter of the bushing normal to the direction of the shackle links 22 is substantially zero by virtue of the free pivotal connections at 24, the torsional effect of the rubber bushing 28 as between the sleeves 27 and 29 being negligible with a practical length of link. The stiffness of the rubber bushings 28 in a direction tangential of the mounting ring 16 is controlled by the rubber in shear. The ratio $L_1$ indicated in the formula above is the quotient of the rubber spring rate along a diameter of the bushing divided by the rubber spring rate along the axis of the bushing. This may be controlled and varied within reasonable limits by changing the proportions of the rubber. Generally speaking, the spring rate along a diameter of the bushing will be several times greater than the spring rate along the axis thereof, and, in the case of power plants which have relatively violent and low frequency torsional impulses, a low spring rate along the axis of the bushings is desirable. On the other hand, for support of the engine to the elimination of undue linear excursion the diametral spring rate must be fairly high, whereby it is desired that the ratio $L_1$ be greater than unity. Accordingly, the construction shown in Figs. 1 to 3 inclusive and also in Figs. 4 to 9 inclusive is particularly adapted for use in connection with conventional engines having relatively small diameter mounting annuli rearward of the center of gravity.

Figs. 4, 5, and 6 show an alternative mounting arrangement generally similar in character to that of the first three figures. Herein, the mounting ring 16 is provided with forwardly disposed brackets 18' which serve as supports for bolts 20' on which the rubber bushings 28 are carried. The shackle links 22' extend forwardly and inwardly at hinge connections 26', the shackle links making the appropriate angle $\phi$ with the engine axis. In this arrangement, resilient bushings are located with respect to the mounting ring 16 instead of being located with respect to the engine casing 32, but the operation of the mounting structure as a whole is substantially identical with that previously described. The dimensions $a$ and $m$ are taken to the center of the rubber bushing as shown.

In Figs. 7, 8, and 9, the fuselage 15 is provided with a plurality of paired brackets 50 spaced therearound, these brackets pivotally carrying extended link pairs 52, the individual links of which converge toward and are attached rigidly to a sleeve 53 within which a rubber bushing 28 is held. The several sleeves 53 are tangentially arranged with respect to a tubular ring 54 from which brackets 55 extend to carry bolts 56 engaging the inner sleeves 27 bonded to the bushings 28. In this arrangement, the ring 54 comprises a member to which the power plant 32 is attached by suitable clips 57. The engine, therefore, is rigid with the inner sleeves 27. The plane of respective link pairs 52 makes the angle $\phi$ with the engine axis, the link pairs themselves comprising the pivoted shackles equivalent in function to the shackle links 22 and 22' of the previously described embodiments. The function of the rubber bushings 27 in this embodiment is similar to that of Figs. 1, 2 and 3, the rubber assuming torsional impulses from the engine in shear and assuming vibratory forces acting along a diameter of the bushing, in the plane of the links 52, in tension and compression. The arrangement of Figs. 7, 8, and 9 subscribes to the formula heretofore outlined and the ratio $L_1$ is evaluated by the spring rate of the rubber bushings along the diameter of each with respect to the spring rate of the rubber bushings, in shear, along the axis of each.

Since, in this embodiment, the links 52 are hinged to the fuselage brackets 50 by bolts 59, the whole power plant, including the links 52, may be detached from the fuselage by removal of the several bolts 59. In the other previously described embodiments, the mounting structure rearward of the ring 16 might be fixed to the aircraft and the power plant would be dismounted from the structure by disassembly of the several shackle links 22 or 22'.

Referring now to Figs. 10, 11, 12 and 13, we show an arrangement wherein the ratio $L_1$ is independent of the spring rates of the rubber in the mounting, the ratio being determinate by the geometry of the organization. This mounting is adapted for use in connection with high power engines installed on large nacelles or fuselages.

We show this arrangement in connection with a monocoque type of engine nacelle or fuselage in which 70 represents the stressed annular skin to the inner surface of which is attached an annular bulkhead 71. To the bulkhead 71, at circumferentially spaced intervals, are attached brackets 72 having enlarged openings within which rubber bushing units 74 are located, the outer metallic sleeve of each bushing unit being positioned by a bolt 75 as shown in Fig. 13. The inner sleeve 76 of each bushing unit 74 is engaged by spacers 77 carrying a bolt 78 by which struts 79 are held in fixed relationship to the spacers 77 and the sleeves 76. As indicated, the struts 79 embrace the bushing unit 74 and extend forwardly to be pivotally bolted to a bridge piece 80 as at 81. The joint at 81 is a ball and socket joint as shown in Fig. 13, to allow of limited articulation of the struts 79 relative to the bridge piece 80. Said bridge piece is bolted at one end to a shaft 82 which comprises one of the rocker arm pivots of a radial engine cylinder 83. The other end of the bridge piece 80 is provided with a link 85 attached to another shaft 82 entering the other rocker box of the cylinder 83. The link 85 provides for relative movement of the rocker boxes of individual cylinders due to stresses and temperature changes to which the engine cylinder is subject.

It will be noted that the struts 79 are paired, converging from spaced points 72 on the bulkhead 71 to an intersection $q$ which can occur near bridge pieces 80 as shown. The pairs of struts 79 are disposed around the engine, and, in a preferred arrangement, there is a pair of struts 79 for each engine cylinder (in the rear bank of cylinders in the case of a 2-row engine, as shown). These strut pairs are designated as 86 and, in a sense, are equivalent in function to any one of the shackle links 22 or 22' of the previous embodiments. However, the struts 79 in themselves are subject only to compressive or tensile stresses since they are fully articulated at their ends due to the joint 81 and to the floating support afforded by the rubber unit 74. Accordingly, the rubber unit 74 is deformed for effective cushioning only along its diameter and any deformation along its axis or twisting of the outer bonded sleeve with respect to the inner bonded sleeve is negligible. The plane of each strut pair 86 intersects the engine axis to make the angle $\phi$ therewith and there is no substantial resistance in the strut pairs 86 to forces acting on a normal to their respective planes. As indicated in Fig. 12, respective struts 79 make an angle $\theta$ with each other. Accordingly, the spring rate afforded by the combination of these struts along the tangent to the mounting circle will be equal to $$2K' \cos^2 \frac{\theta}{2}$$

and the spring rate along the line which makes the angle $\phi$ with the engine axis is equal to $$2K' \sin^2 \frac{\theta}{2}$$

(wherein $K'$ is the spring rate longitudinally of respective struts 79). The quotient of these two spring rates, $$L', \text{ is } \cot^2 \frac{\theta}{2}$$

Thus the strut pairs 86 are equivalent in action to the shackles 22 or 22'. The basic design formula may therefore be rewritten as follows:

$$\frac{a}{m} = \frac{1}{2} \frac{\sin^2 \phi}{\tan^2 \frac{\theta}{2} + \sin^2 \phi}$$

The proper design of the mount then resolves into a purely geometric matter without reference to the specific proportions of the rubber or resilient devices used in the mount. In effect, the several struts 79 in connection with the rubber units 74 comprise merely axially resilient struts and it is within the scope of the invention to include other forms of axially resilient struts than those shown. The rubber bushing units indicated are practical and commercially available and thus are deemed to be a satisfactory unit in reducing this engine mount to practice. The strut type mount of Figs. 10 to 13, though shown as attached to the outer cylinder ends, may likewise be arranged as in the other figures, wherein the pivots 81 would be on the engine case rather than on the cylinders.

In the several embodiments above described the power plant and mount are arranged concentrically and the simplified design formulae included herein are based upon this concentric relationship. However, it is not deemed that this relationship is mandatory for a successful design of an engine mount according to the principles of the invention—the mounting units might be disposed assymmetrically and still retain the advantages taught.

In connection with the several embodiments shown, the power plant, or engine, whichever is mentioned, includes those units which are attached to or movable with the basic engine structure, these including such units as the propeller and those accessories which are normally bolted to the rear end of the engine. Also, in the several structures shown, we have indicated a low drag cowling which as such, is not a part of the invention but is an accepted adjunct to an aircraft power plant installation. In certain instances, the low drag cowling may be attached to the engine in which case it forms a part of the power plant. In other instances, the low drag cowling as indicated in Figs. 10 and 11 may be a part of the nacelle or fuselage structure in which case it is independent of the engine per se.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In a flexible engine mounting, a mounting structure, a plurality of links each pivoted at one end thereto, an engine to which said links are pivoted at their other ends, and a resilient connection in each said link said connections having similar spring rates, said links converging from said mounting structure and comprising elements of a conical frustum, the point of conical convergence of the link axes intersecting at a point more remote from the mounting structure than the c. g. of said engine.

2. In a flexible engine mounting, a mounting ring, a power plant having annularly disposed mounting bosses, the annulus defined by said annularly disposed losses being spaced from and smaller in diameter than said mounting ring, a plurality of links spaced around and pivoted at their ends respectively to said ring and annulus, and an elastic connection between an end of each link and the associated mounting structure.

3. In a flexible engine mounting, a mounting ring, a power plant having annularly disposed mounting bosses, the annulus defined by said annularly disposed losses being spaced from and smaller in diameter than said mounting ring, a plurality of links spaced around and pivoted at their ends respectively to said ring and annulus, and an elastic connection between an end of each link and the associated mounting structure, said links in the aggregate comprising partial conical elements the cone apex of which is more remote from said mounting ring than the engine c. g.

4. In an engine mounting, a structure having a plurality of circumferentially spaced and disposed rubber cushions attached thereto, a strut floatingly supported in each cushion, the struts being paired to converge substantially to a meeting point on an annulus of smaller diameter than said cushion attachments, forming a plurality of meeting points equivalent in number to half the number of struts, a pivot connection between each link and said engine.

5. In an engine mount, a mounting structure having fittings disposed in a circle thereon, similar independent axially resilient links each pivoted at one end to one said fitting, and a power plant having a mounting annulus of smaller diameter than said fitting circle axially spaced therefrom, to which the other ends of said links are respectively pivoted.

6. In a flexible mounting for a radial cylinder engine having a mounting annulus concentric with the engine crankshaft and spaced rearward of the engine center of gravity, a plurality of circumferentially spaced hinges on and tangentially disposed relative to said annulus, a link on each hinge oscillatable relative to the engine in a plane including the engine axis, said links slanting outwardly and rearwardly from the engine, a mounting structure to which respective links are hinged on axes parallel to the respective first mentioned hinges, one of said hinges comprising resilient means allowing of axial yield and angular yield between the engine and mounting annulus.

7. In a flexible mounting for a radial cylinder engine having a mounting annulus concentric with the engine crankshaft and spaced rearward of the engine center of gravity, a plurality of circumferentially spaced hinges on and tangentially disposed relative to said annulus, a link on each hinge oscillatable relative to the engine in a plane including the engine axis, said link slanting outwardly and rearwardly from the engine, a mounting structure to which respective links are hinged on axes parallel to the respective first mentioned hinges, one of said hinges comprising resilient means allowing of axial and angular yield between the engine and mounting annulus, the slant of said links being such that forward and inward projections of the respective links intersect the engine shaft axis ahead of the engine center of gravity.

8. In a mount for a vibratory body, a mounting structure spaced therefrom, and a plurality of axially resilient links each pivoted at its respective ends to said body and structure, said links being so inclined that their respective axes approach the body axis at a point more remote from the mounting structure than the center of gravity of the body.

9. In a mount for a vibratory body, a mounting structure spaced therefrom, links extending between and pivoted at their respective ends to said body and structure, said links having therein resilient means so disposed as to permit of longitudinal deformation thereof and lateral deviation of respective pivot points on the body and structure, said links being so disposed that the longitudinal mean axes thereof intersect at a point in the body more remote from the mounting structure than the body center of gravity.

10. A mounting for a radial cylinder aircraft engine comprising a support having angularly disposed mounting elements on an annulus of greater diameter than the engine spaced rearwardly of the engine cylinders and rearward of the engine center of gravity, and a plurality of axially resilient links independently pivoted to the support elements, extending forwardly and inwardly, and means for pivotally attaching the forward end of each said link to an engine cylinder.

11. A mounting for a radial cylinder aircraft engine comprising a support having angularly disposed mounting elements on an annulus of greater diameter than the engine spaced rearwardly of the engine cylinders and rearward of the engine center of gravity, and a plurality of axially resilient links independently pivoted to the support elements, extending forwardly and inwardly, and means for pivotally attaching the forward end of each said link to an engine cylinder, said axially resilient links each comprising an elongated relatively rigid element having a resilient device at at least one end thereof.

12. A mounting for an engine comprising a support member, a mounting member forming part of the engine, the engine c. g. being forward of said support member, a plurality of links annularly spaced around and pivotally connected at their one ends to one said member, and pivotal annularly disposed resilient connections between the other ends of said links and the other said member, said mounting member annulus being smaller in diameter than said support member annulus whereby said links are inclined forwardly and inwardly from said support member in a manner such that planes through the several links and tangent to respective annuli intersect at a point on the engine axis ahead of its c. g.

13. A mounting for a radial cylinder engine comprising links pivoted to and diverging outwardly and rearwardly from respective engine cylinders, an independent resilient axial cushioning means incorporated in each link, and a structure to which said links are individually pivoted.

14. In a mounting for a radial engine having a mounting annulus spaced rearwardly from its center of gravity, at least three link units pivoted to said engine around said annulus, said units having cushioning elements therein for yield of the links lengthwise thereof and tangentially of the engine, the link units extending outwardly and rearwardly from the annulus, the mean fore and aft axes of respective link units intersecting the engine axis at a point thereon forward of the engine center of gravity, and a structure to which the respective link units are individually hinged.

15. In a mount for a radial cylinder engine, a mounting structure axially spaced from the plane of the engine cylinders, and a plurality of slanted link elements resiliently deformable along their own axes each articulately attached at one end to said structure and at its other end to an outer end portion of an engine cylinder.

16. In a mount for a radial cylinder engine, a mounting ring larger in diameter than the engine itself, said ring being spaced axially from the plane of the engine cylinders, and a plurality of slanted link elements resiliently deformable along their own axes articulately connecting said ring with the outer ends of the engine cylinders.

17. In a mount for a radial cylinder engine, a mounting ring larger in diameter than the engine itself, said ring being spaced axially from the plane of the engine cylinders, and a plurality of slanted link elements resiliently deformable along their own axes articulately connecting said ring with the outer ends of the engine cylinders, each said link being articulated at each end relative to the engine and ring.

18. In a mount for a radial cylinder engine, a mounting ring larger in diameter than the engine itself, said ring being spaced axially from the plane of the engine cylinders, and a plurality of link elements connecting said ring with the outer ends of the engine cylinders, each said link being articulated at each end relative to the engine and ring, and including axially resilient means therein.

19. In a flexible engine mounting, a power plant having annularly disposed mounting boss elements, a supporting structure having annularly disposed attachment elements, the indicated engine annulus being smaller in diameter than, substantially concentric with, and axially spaced from the indicated supporting structure annulus, and a plurality of slanted elastic links spaced around said annuli and pivoted at their ends respectively to said mounting boss elements and attachment elements.

20. In a flexible engine mounting, a power plant having annularly disposed mounting boss elements, a supporting structure having annularly disposed attachment elements, the indicated engine annulus being smaller in diameter than, substantially concentric with, and axially spaced from the indicated supporting structure annulus, a plurality of slanted links spaced around said annuli and pivoted at their ends respectively to said mounting boss elements and to said attachment elements, and an elastic connection between at least one end of each link and its associated element.

21. A mounting for an engine including substantially annularly disposed mounting bosses comprising link elements pivoted to and diverging radially and axially from said annulus axis, an independent resilient cushioning means in each link deformable in the direction of the link axis, and a structure to which said links are individually pivoted.

22. A mounting for an engine including substantially annularly disposed mounting bosses comprising a plurality of pairs of struts, each pair being secured to one said boss, and each strut of each pair being freely articulated at the securement, the struts of each pair diverging outwardly from respective bosses and the pairs, relative to each other, diverging outwardly from said bosses, a mounting structure to which the several links are articulated at their other ends, and axially resilient means in one articulation of each link.

23. A mounting for an engine including substantially annularly disposed mounting bosses, comprising a first set of links articulated to said bosses and extending tangentially in one direction and outwardly and axially relative to the annulus, a second set of links articulated to said bosses and extending tangentially in the other direction and outwardly and axially relative to said annulus, each said link incorporating resilient means deformable along the link axis, and a support structure to which the outer ends of said links are respectively articulated.

KENNETH A. BROWNE.
EDWARD S. TAYLOR.